US012737447B2

(12) United States Patent
Palanki

(10) Patent No.: US 12,737,447 B2
(45) Date of Patent: Sep. 15, 2026

(54) QUANTUM COMPUTING ENHANCED LARGE LANGUAGE MODEL (LLM) SECURITY PROTECTIONS

(71) Applicant: American Express Travel Related Services Company, Inc., New York, NY (US)

(72) Inventor: Hiranmayi Palanki, Tampa, FL (US)

(73) Assignee: American Express Travel Related Services Company, Inc., New York, NY (US)

( * ) Notice: Subject to any disclaimer, the term of this patent is extended or adjusted under 35 U.S.C. 154(b) by 235 days.

(21) Appl. No.: 18/426,714

(22) Filed: Jan. 30, 2024

(65) Prior Publication Data

US 2025/0245315 A1 Jul. 31, 2025

(51) Int. Cl.
*G06F 21/50* (2013.01)
*G06N 10/80* (2022.01)

(52) U.S. Cl.
CPC ............ *G06F 21/50* (2013.01); *G06N 10/80* (2022.01)

(58) Field of Classification Search
USPC ............................................................ 726/22
See application file for complete search history.

(56) References Cited

U.S. PATENT DOCUMENTS

| | | | | |
|---|---|---|---|---|
| 10,410,635 | B2 * | 9/2019 | Mont-Reynaud | G10L 15/02 |
| 12,189,785 | B1 * | 1/2025 | Reznik | G06Q 10/0875 |
| 2013/0343390 | A1 * | 12/2013 | Moriarty | H04L 43/0852 370/392 |
| 2023/0231785 | A1 * | 7/2023 | Kumar | H04L 41/122 709/224 |
| 2025/0086308 | A1 * | 3/2025 | Crume | G06F 21/6245 |
| 2025/0088517 | A1 * | 3/2025 | Davraev | H04L 63/14 |
| 2025/0103715 | A1 * | 3/2025 | Jackson | G06F 21/566 |
| 2025/0209176 | A1 * | 6/2025 | Palanki | G06F 21/577 |
| 2026/0073325 | A1 * | 3/2026 | Belanger | G06Q 10/02 |

* cited by examiner

*Primary Examiner* — Sakinah White-Taylor
(74) *Attorney, Agent, or Firm* — Thomas | Horstemeyer, LLP

(57) ABSTRACT

Disclosed are various approaches for quantum computing enhanced language model (LLM) security protections. In some examples, an LLM communication such as an LLM prompt, or an LLM response can be received. A computing environment type decision between a digital computing environment or a quantum computing environment can be generated based at least in part on the LLM communication processing latency value and a threshold latency value. A selected one of the classical digital computing environment and the quantum computing environment can be used for an LLM security analysis based at least in part on the computing environment type decision.

20 Claims, 6 Drawing Sheets

QUANTUM COMPUTING ENHANCED LARGE LANGUAGE MODEL (LLM) SECURITY PROTECTIONS

BACKGROUND

Large language models (LLMs) are expanding the use of artificial intelligence (AI) exponentially. As this expansion continues, companies developing LLMs will contend with the challenges of ensuring the security of large amounts of data. The security of the data in the LLM itself is important, as are the responses that it creates for users. One of the significant concerns is the potential for misuse and errors introduced by the ubiquitous use of LLMs. These models can generate highly realistic and coherent text, making them a tool with the ability to provide great utility as well as great harm.

Their potential for misuse is concerning, enabling the creation of deceptive and inaccurate content. Biases can perpetuate unfair commentary that can contribute to societal problems. LLMs also raise privacy concerns as they could inadvertently generate text containing sensitive personal and enterprise information. As the use of LLMs proliferates, there is a need for enterprises to have a way to ensure that applications and programmatic usage of an LLM is safe, secure, and free from various issues.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
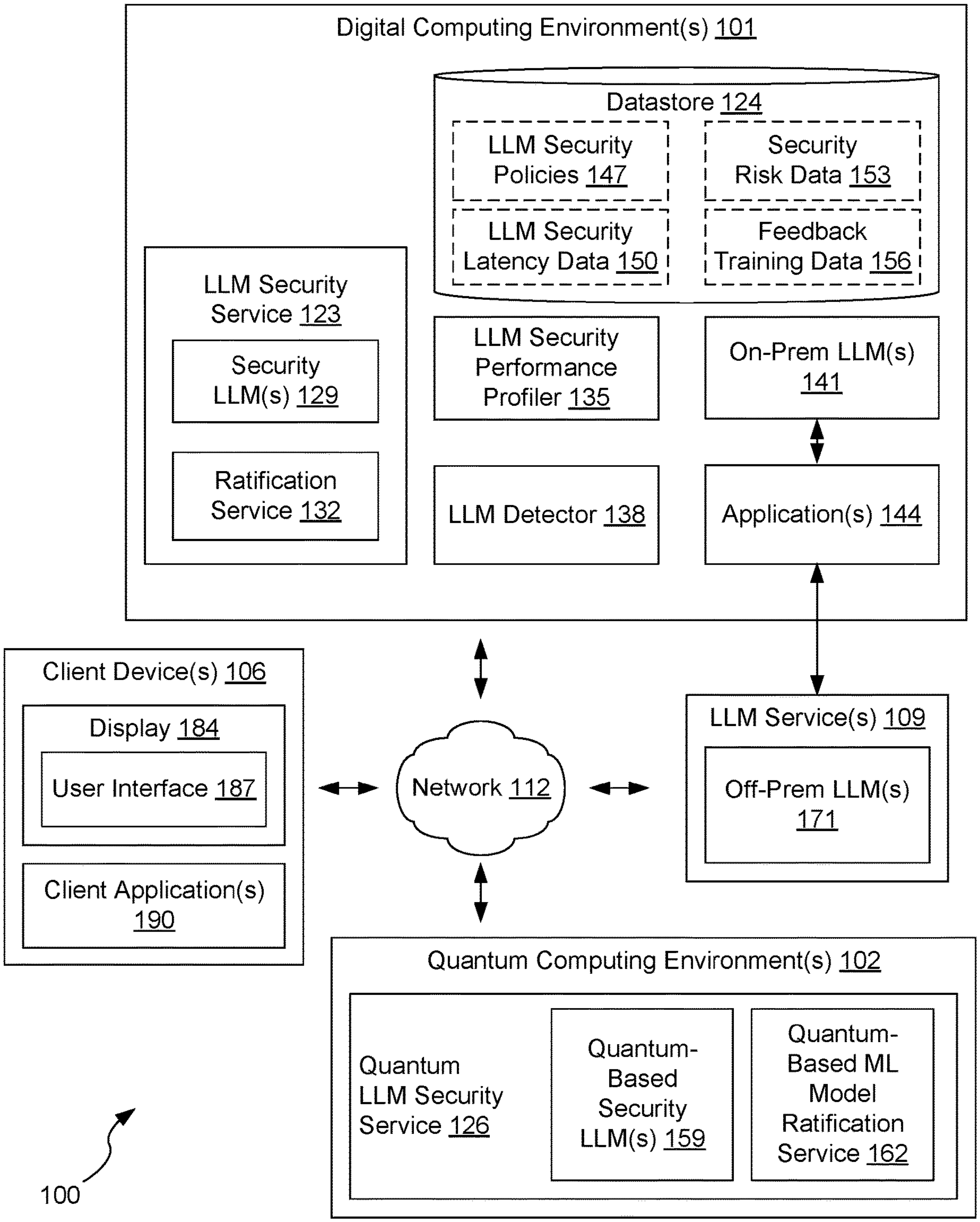
FIG. 1 is a drawing of a networked environment that includes components that provide quantum computing enhancements for large language model (LLM) security protections according to various embodiments of the present disclosure.

Disclosed are various approaches for quantum computing enhancements for Large Language Model (LLM) security protections. Security protections for LLM services can include prompt injection prevention, Secure Data Element (SDE) leakage prevention, hallucination or incorrect answer prevention, toxicity prevention, bias prevention, Intellectual Property (IP) leakage prevention, and others. While the LLM services can provide some level of protection internally, these protections may not match a level of protection desired by a particular enterprise. Further, LLM services generally cannot prevent users from transmitting prompts that may include SDE, IP, prompt injections, and other issues. The LLM services can also include or drive chat services, help services, and other types of services where responses can be time-sensitive. As a result, long-duration security protections can be intrusive.

However, the present disclosure describes mechanisms that can provide a solution to the issues facing LLM security protections. For example, the present disclosure describes the use of an ensemble of security LLMs and classical machine learning models to inspect requests and responses to LLMs for security threats and apply protective policies. An LLM detector can discover usage of on-premise LLMs and off-premise LLMs within a particular network or computing environment. The described mechanisms also include a performance profiler that switches between digital-computing-based security protections and quantum-computing-based security protections based at least in part on performance such as latency overhead of the digital-computing-based security protections.

The mechanisms described can provide a number of benefits over other technologies, including those that are performed using computer systems. The quantum computing enhancements for LLM security protections concepts improve computer systems by increasing the speed of LLM protections, for example, by using quantum-computing-based security LLMs to perform protections on LLM communications with a target LLM. The concepts described can also improve computer systems by increasing the speed of LLM protections using a quantum-computing-based ratification service that serves as a confidence check for initial security decisions of the security LLMs. The mechanisms described can also switch between digital-computing-based security protections and quantum-computing-based security protections provides an improvement in computer systems by a specific way of integrating classical or digital computing with quantum computing for LLM security protection. The present disclosure also improves computer systems using multiple classical machine learning models that increase the accuracy of initial LLM-based security decisions by combining results from multiple machine learning techniques to confirm or refute the initial security decision.

In the following discussion, a general description of the quantum computing enhancement system for LLM security protections is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With reference to FIG. 1, shown is a networked environment 100 according to various embodiments. The networked environment 100 can include a digital computing environment 101, a quantum computing environment 102, client devices 106, and LLM services 109, which can be in data communication with each other via a network 112.

The network 112 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The digital computing environment 101 can be referred to as "classical," "digital-based," or "bit-based" since its computing architecture performs bit-based operations using bits that maintain a single, binary state at a given time for information storage and manipulation. The software executed using the digital computing environment 101 can also be referred to as "classical," "digital," or "bit-based," and can use bit-based operations. The bit can be considered a basic unit of information in classical digital computing and digital communications. The bit can be maintained based at least in part on voltage or charge, with a low voltage or charge representing a value of zero ("0") and a high voltage or charge representing a value of one ("1").

By contrast, the quantum computing environment 102 can be referred to as a "quantum-based" or "qubit-based" computing architecture that performs operations using quantum bits or qubits that can represent multiple states at a given time for information storage and manipulation. The software executed using quantum computing environment 102 can also be referred to as "quantum-based," or "qubit-based," and can use qubit-based operations. The qubit can be considered a basic unit of information in quantum computing and quantum communications. The qubit can be maintained based at least in part on the spin of electron or polarization of a photon. As a result, the digital computing environment 101 can also be referred to as a classical or digital computing environment by contrast with the quantum computing environment 102, even if the quantum computing environment 102 can use some level of digital computing for user interfaces, data storage, network interfaces, and so on. The digital computing environment 101 can include an LLM security service 123, which can also be referred to as a digital or classical LLM security service 123. The quantum computing environment 102 can include a quantum LLM security service 126.

The digital computing environment 101 can include one or more computing devices that include a processor, a memory, and/or a network interface. For example, the computing devices can be configured to perform computations on behalf of other computing devices or applications. As another example, such computing devices can host and/or provide content to other computing devices in response to requests for content. The digital computing environment 101 can provide an environment for the LLM security service 123, the security LLMs 129, the ratification service 132, the LLM security performance profiler 135, the LLM detector 138, the on-premises LLMs 141, the applications 144, and other instructions.

The digital computing environment 101 can employ a plurality of computing devices that can be arranged in one or more server banks or computer banks or other arrangements. Such computing devices can be located in a single installation or can be distributed among many different geographical locations. For example, the digital computing environment 101 can include a plurality of computing devices that together can include a hosted computing resource, a grid computing resource or any other distributed computing arrangement. In some cases, the digital computing environment 101 can correspond to an elastic computing resource where the allotted capacity of processing, network, storage, or other computing-related resources can vary over time. Various applications or other functionality can be executed in the digital computing environment 101.

Various data is stored in a datastore 124 that is accessible to the digital computing environment 101. The datastore 124 can be representative of a plurality of datastores 124, which can include relational databases or non-relational databases such as object-oriented databases, hierarchical databases, hash tables or similar key-value datastores, as well as other data storage applications or data structures. Moreover, combinations of these databases, data storage applications, and/or data structures can be used together to provide a single, logical, datastore. The data stored in the datastore 124 is associated with the operation of the various applications or functional entities described below. The data is stored in a datastore 124 can include LLM security policies 147, LLM security latency data 150, security risk data 153, feedback training data 156, data of the LLM security service 123, the security LLMs 129, the ratification service 132, the LLM security performance profiler 135, the LLM detector 138, the on-premises LLMs 141, and the applications 144, and other data.

The quantum computing environment 102 can include the quantum LLM security service 126, as well as other quantum-computing-based applications. The quantum LLM security service 126 can include quantum-based security LLMs 159, quantum-based ratification service 162, and other quantum-computing-based subservices. The quantum computing environment 102 can utilize classical computing components for user interactions and control systems. However, at least a portion of the computations of the quantum computing environment 102 can utilize quantum-computing-specific hardware components such as physical qubit devices such as trapped ion qubit devices, superconducting qubit devices, and others. A Josephson-junction based qubit device can use one or more Josephson junctions to provide a nonlinearity for the superconducting qubit device. The quantum computing environment 102 can use a classical computer networking interface with the network 112. The quantum computing environment 102 can also utilize classical computing components for user interface components and conventional storage.

The client device 106 is representative of a plurality of client devices 106 that can be coupled to the network 112. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 184, such as liquid crystal displays (LCDs), gas plasma-based flat panel displays, organic light emitting diode (OLED) displays, electrophoretic ink ("E-ink") displays, projectors, or other types of display devices. In some instances, the displays 184 can be a component of the client device 106 or can be connected to the client device 106 through a wired or wireless connection.

The client device 106 can be configured to execute various applications such as a client application 190 or other applications. The client application 160 can be executed in a client device 106 to access network content served up by the digital computing environment 101 or other servers, thereby rendering a user interface 187 on the displays 184. To this end, the client application 160 can include an LLM application 130, a browser, a dedicated application, or other executable, and the user interface 187 can include a network page, an application screen, or other user mechanism for obtaining user input. The client device 106 can be configured to execute client applications 190 such as browser applications, chat applications, messaging applications, email applications, social networking applications, word processors, spreadsheets, or other applications.

The LLM security service 123 can inspect LLM communications to apply LLM security policies 147. The LLM communications can include LLM prompts and LLM responses. LLM prompts can refer to data transmitted to an end-use LLM in order to provoke an LLM response. LLM responses can refer to data transmitted from an end-use LLM in response to an LLM prompt. An application 144 can generate and transmit an LLM prompt to an end-use LLM based at least in part on user input entered through the user interface 187. The end-use LLMs can include on-premises LLMs 141 within the digital computing environment 101 and off-premises LLMs 171 of the LLM services 109. By contrast with the end-use LLMs, the security LLMs 129 are not the intended target LLM of an end user or application 144.

The LLM security service 123 can apply LLM security policies 147 to LLM communications. The LLM security service 123 can apply LLM security policies 147 by processing the LLM communications using an ensemble of security LLMs 129 and classical machine learning models. The LLM security service 123 can use the classical machine learning models of the ratification service 132 to evaluate the initial security decisions of the security LLMs 129 specified in the LLM security policies 147. The ratification service 132 can include a number of classical or "non-LLM" machine learning models. The machine learning models of the ratification service 132 can vote on whether to "ratify" or approve individual ones of the initial security decisions of the security LLMs 129.

The security LLMs 129 can include LLMs that are trained to take LLM communications, such as LLM prompts and LLM responses, as inputs to generate initial security decisions. The particular security LLM 129 can generate the initial security decisions as security risk data 153 that specifies a particular security rule and whether the LLM communication violates the specified security rule. In an instance in which the LLM communication violates a security rule, the initial security decision can also include a modified LLM communication and a natural language explanation that describes how the original LLM communication violates the security rule.

The security LLMs 129 can include a number of different LLMs that are trained to make security decisions for a particular type of LLM security policy 147. A security LLM 129 can take inputs including a text of the LLM communication to identify whether the LLM communication violates a security rule or otherwise is associated with a particular LLM security policy 147. The security LLMs 129 can include separate LLMs corresponding to the types of LLM security policies 147. For example, the LLM security policies 147 can enforce prompt injection prevention, SDE leakage prevention, hallucination prevention, toxicity prevention, bias prevention, IP leakage prevention, and so on. As a result, the security LLMs 129 can include separate LLMs for prompt injection prevention, SDE leakage prevention, hallucination prevention, toxicity prevention, bias prevention, IP leakage prevention, and so on.

A prompt injection prevention security LLM 129 can identify whether an LLM communication includes malicious replacement or other modifications. An SDE leakage prevention security LLM 129 can identify whether an LLM communication includes SDEs such as personal names, dates of birth, social security numbers, addresses, phone numbers, email addresses, financial information, health information, driver's license numbers, passport numbers, national identification numbers, biometric data, authentication information, employment information, criminal history, ethnicities, races, sexual orientations, gender identities, religious affiliations, political affiliations, child information, and so on.

LLMs can sometimes generate responses that seem plausible but are actually inaccurate, fictional, or unsupported by facts. These inaccurate LLM responses can be referred to as "hallucinations." A hallucination prevention security LLM 129 can check whether an LLM response is factually accurate according to a predetermined and stored factual knowledge base. A toxicity prevention security LLM 129 can identify whether an LLM communication includes toxicity such as cursing, harsh tones, and other issues in its natural language message. A toxicity prevention security LLM 129 can identify whether an LLM communication includes biases such as racial biases, sexual biases, gender biases, age biases, disability biases, religious biases, socioeconomic biases, beauty biases, and other biases. An IP leakage prevention security LLM 129 can identify whether an LLM communication includes intellectual property such as trade secrets, patent invention information (for example, prior to public disclosure or publication), pre-publication information such as important announcements, copyrighted information, pre-registration trademark information, internal discussion information, and other enterprise information that the does not want to make public.

The ratification service 132 can include a number of different machine learning models that can confirm or refute the initial security decisions of the security LLMs 129 specified in the LLM security policies 147. For example, the ratification service 132 include a support vector machine model, a random forest model, a neural network model, and other types of classical machine learning models. A respective machine learning model can decide whether to confirm or refute an initial security decision of a security LLM 129.

The respective machine learning model can take inputs including one or more of the LLM-based initial security decisions, a type of the security issue, the LLM communication, an identity of the target LLM or LLM service of the LLM communication, or any combination thereof. The respective machine learning model can output an intermediate security decision or another indication of whether to confirm or refute an initial security decision. The intermediate security decision can act as a vote. If a predetermined number of classical machine learning models vote to confirm the initial security decision, then the ratification service 132 can provide a final security decision that matches the initial security decision on a particular LLM security policy

147. Otherwise, the ratification service 132 can provide a final security decision that refutes or overturns the initial security decision.

The security risk data 153 can include a history or log of final security decisions. The security risk data 153 can also include the initial security decision of the security LLM 129, the intermediate security decisions of the classical machine learning models, the LLM communication, a user identifier of a user associated with the LLM communication, and an LLM identifier of the end-use LLM being used.

The LLM security service 123 can store the inputs to the ratification service 132 and the outputs from the ratification service 132 as feedback training data 156 for the respective security LLM 129. The LLM security service 123 can periodically train the respective security LLM 129 using the feedback training data 156.

The LLM security performance profiler 135 can determine whether to increase or decrease usage of the quantum LLM security service 126 based at least in part on the LLM security latency data 150. The LLM security latency data 150 can include a timestamped history of LLM communication processing latencies. An LLM communication processing latency can provide an indication of an amount of time the processing the LLM security service 123 takes to process an LLM communication using at least one security LLM 129 and the ratification service 132. A particular LLM communication processing latency can be LLM security policy specific. For example, an LLM communication processing latency can include (1) the time it takes for a particular type of security LLM 129 to generate an initial security decision and (2) the time it takes for the ratification service 132 to confirm or refute the initial security decision to generate a final security decision.

The LLM security performance profiler 135 can monitor LLM security latency data 150 and calculate aggregated latency metrics based at least in part on all or a subset of the LLM communication processing latencies for various LLM security policies 147. The LLM security performance profiler 135 can calculate an aggregated latency metric for all of the LLM security policies 147, for a predetermined subset of the LLM security policies 147, and for individual ones of the LLM security policies 147. For example, LLM security performance profiler 135 can identify an aggregated latency metric for "prompt injection prevention" processing, an aggregated latency metric for "SDE leakage prevention," an aggregated latency metric for "all policies," and so on. An aggregated latency metric can refer to an average latency value, a moving average latency value, an exponential moving average latency value, or another latency value calculated using a subset of the LLM communication processing latencies for the specified type or types of LLM security policies 147. As a result, the aggregated latency metrics can include metrics for different types of LLM security policies 147 and different sets of LLM security policies 147.

The LLM security performance profiler 135 can determine whether the LLM security latency data 150 indicates that the aggregated latency metric is over a threshold latency value. The LLM security performance profiler 135 can include a single threshold latency value applicable to all aggregated latency metrics. However, in other embodiments, the LLM security performance profiler 135 can include different threshold latency values for different types of LLM security policies 147 and different sets of LLM security policies 147 corresponding to the aggregated latency metrics.

If the aggregated latency metric or other latency value of the LLM security service 123 is over a threshold latency value, then the LLM security performance profiler 135 can increase usage of the quantum LLM security service 126 by sending LLM communications to the quantum LLM security service 126. Once the latency value of the LLM security service 123 is under the threshold latency value, then the then the LLM security performance profiler 135 can decrease usage of the quantum LLM security service 126 by sending LLM communications to the LLM security service 123 of the digital computing environment 101.

The LLM security performance profiler 135 can also consider historical latency metrics for a corresponding time and date. If historical latency metrics for a corresponding time and date indicate latencies for a previous time and date associated with a current time and date increased over the threshold latency value, the LLM security performance profiler 135 can increase usage of the quantum LLM security service 126. This can enable the LLM security performance profiler 135 to increase usage of the quantum LLM security service 126 before the aggregated latency metric at the present time reaches the threshold latency value.

While shown as a separate component from the LLM security service 123, the LLM security performance profiler 135 can alternatively be a component of the LLM security service 123. The LLM security performance profiler 135 can monitor the LLM communication data and assigns specific LLM prompts and LLM responses to a selected one of the LLM security service 123 and the quantum LLM security service 126 based at least in part on the LLM security latency data 150.

The LLM detector 138 can include a service that identifies whether client devices 106 interact with applications 144 to transmit and receive LLM communications from a particular network or subnetwork of the digital computing environment 101. The LLM communications can include transmitting and receiving LLM communications with end-use LLMs and applications 144, whether through a web application of a client device 106 connected to a network of the digital computing environment 101. In some examples, the on-premises LLMs 141 can include LLMs that can be considered a subcomponent of an application 144. The LLM detector 138 can intercept data packets transmitted within the subnetwork and identify whether the data packets include known addresses of end-use LLMs, formatting utilized by end-use LLMs, and other data associated with end-use LLMs.

The on-premises LLMs 141 can include bespoke enterprise-generated LLMs, enterprise-trained LLMs, and any other LLMs that are hosted on-premises by an enterprise computing environment. The enterprise computing environment can be described in a manner similar to the digital computing environment 101. While on-premises LLMs 141 are shown within the digital computing environment 101, the enterprise computing environment can alternatively be separate from the digital computing environment 101 of the LLM security service 123.

The applications 144 can include generative AI software used for various purposes and enterprise productivity. The applications 144 can incorporate generative AI. The applications 144 can incorporate generative AI by including generative AI code in the application itself, by network communications with generative AI components such as an end-use LLM such as on-premises LLMs 141 and off-premises LLMs 171, or any combination thereof.

The LLM security policies 147 can refer to rules for interactions with on-premises LLMs 141 and off-premises LLMs 171. The LLM security policies 147 can specify a subset of security LLMs 129 for the LLM security service 123 to utilize. The LLM security policies 147 can be specific to one or more of a particular application, a particular end-use LLM, a particular user identifier, a particular enterprise group, or any combination thereof. For example, an LLM security policy 147 can specify that a particular application, a particular end-use LLM, a particular user identifier, a particular enterprise group, or any combination thereof is to be processed using a particular subset of security LLMs 129. The LLM security policies 147 can also indicate different subsets of security LLMs 129 based at least in part on a type of LLM communication received. The LLM communication types can include LLM prompts and LLM responses.

The quantum LLM security service 126 can refer to a quantum-computing-based version of the LLM security service 123. Likewise, the quantum-based security LLMs 159 can refer to a quantum-computing-based version of the security LLMs 129, and the quantum-based ratification service 162 can refer to a quantum-computing-based version of the ratification service 132. Unlike the classical computing version of the LLM security service 123, the components of the quantum LLM security service 126 can utilize quantum programs that include a number of quantum circuits. The quantum circuits of the quantum-based ratification service 162 can include a number of quantum gates. The quantum LLM security service 126 and its subcomponents can also utilize reversible quantum circuits.

An LLM detector can discover usage of on-premises LLMs and off-premises LLMs within a particular network or computing environment. The described mechanisms also include a performance profiler that switches between digital-computing-based security protections and quantum-computing-based security protections based at least in part on performance such as latency overhead of the digital-computing-based security protections.

Figure 2:
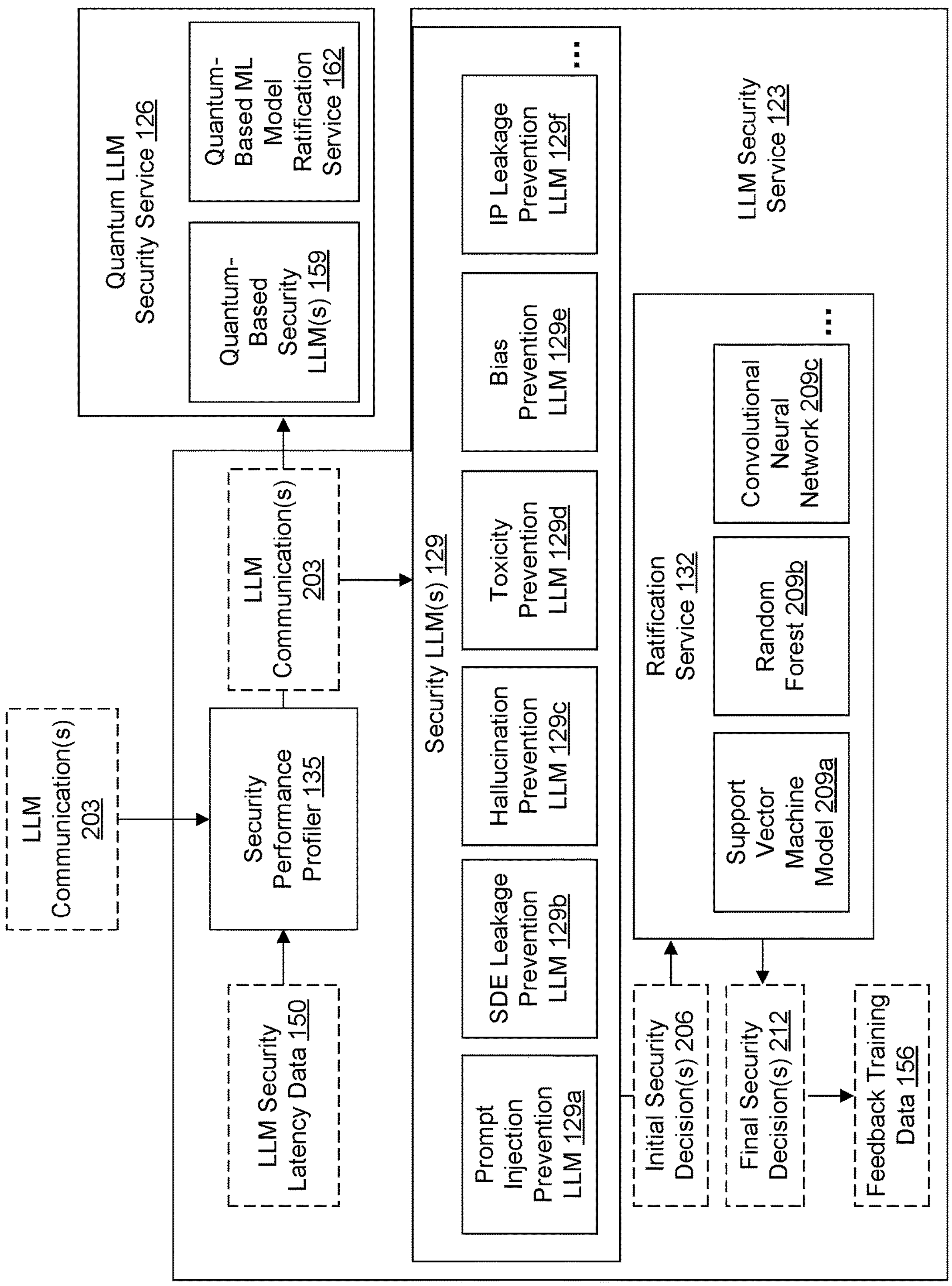
FIG. 2 illustrates an example of implementing quantum computing enhancements for LLM security protections using the components of the networked environment of FIG. 1 according to various embodiments of the present disclosure.

FIG. 2 shows an example of how the components of the networked environment 100 work in concert to provide quantum computing enhanced large language model (LLM) security protections. While actions can be described as being performed using a particular component of the networked environment 100, aspects of the actions can be provided by other components of the networked environment 100. The security LLMs 129 can include a prompt injection prevention LLM 129*a*, an SDE leakage prevention LLM 129*b*, a hallucination prevention LLM 129*c*, a toxicity prevention LLM 129*d*, a bias prevention LLM 129*e*, and an IP leakage prevention LLM 129*f*. The ratification service 132 can include machine learning models 209 including a support vector machine model 209*a*, a random forest model 209*b*, and a convolutional neural network model 209*c*.

The quantum-based security LLMs 159 can include a set of quantum-circuit-based LLMs that match the security LLMs 129. The quantum-based security LLMs 159 can include LLMs for prompt injection prevention, SDE leakage prevention, hallucination prevention, toxicity prevention, bias prevention, and IP leakage prevention. The quantum-based ratification service can also include a set of quantum-circuit-based machine learning models that match the machine learning models 209.

The LLM security service 123 can monitor LLM communications 203 and LLM security latency data 150. The LLM communications 203 can include LLM prompts received from a client device 106 and/or an LLM application 144, as well as LLM responses received from end-use LLMs in response to the LLM prompts. As indicated earlier, the end-use LLMs can include on-premises LLMs 141 and off-premises LLMs 141. An LLM communication 203 can include a message and a network endpoint address. The network endpoint address can include an address of an end-use LLM, an application 144, or a client device 106.

The LLM security performance profiler 135 can determine whether to increase or decrease usage of the quantum LLM security service 126 based at least in part on the LLM security latency data 150. For example, the LLM security performance profiler 135 can determine whether the LLM security latency data 150 indicates that latency of the LLM security service 123 is over a threshold latency. If the latency of the LLM security service 123 is lesser than (or equal to) a threshold latency, the LLM security service 123 can process the LLM communications 203 using classical computing resources. However, if the latency of the LLM security service 123 is greater than (or equal to) a first threshold latency, then the LLM security performance profiler 135 can increase usage of the quantum LLM security service 126. The LLM security performance profiler 135 transmit LLM communications 203 to the quantum LLM security service 126 for processing.

The LLM security performance profiler 135 can continue to transmit the LLM communications 203 to the quantum LLM security service 126 until the latency of the LLM security service 123 is lesser than (or equal to) the first threshold latency. In some examples, the LLM security performance profiler 135 can continue to transmit the LLM communications 203 to the quantum LLM security service 126 until the latency of the LLM security service 123 is lesser than (or equal to) a second threshold latency that is different than the first threshold latency.

In one nonlimiting example, the latency can be below the threshold latency, and the LLM security service 123 can process the LLM communications 203. The LLM security service 123 can receive an LLM communication 203. The LLM security service 123 can analyze data of the LLM communication 203 to the identify one or more of a particular application 144, a particular end-use LLM, a particular user identifier, a particular enterprise group, or any combination thereof. The LLM security service 123 can identify an LLM security policy 147 using this information. The LLM security service 123 can also identify an LLM communication type of the LLM communication 203. The LLM communication type can indicate that the LLM communication 203 is an LLM prompt or an LLM response. The LLM security service 123 can identify a subset of security LLMs 129 specified in the LLM security policy 147 based at least in part on the LLM communication type, the application 144, the end-use LLM, the user identifier, the particular enterprise group, any combination thereof.

The LLM security service 123 can perform a security analysis that includes processing the LLM communication 203 using the specified subset of the security LLMs 129 to generate an initial security decision 206. A security LLM 129 can generate an initial security decision 206 that includes a LLM security policy violation status. The LLM security policy violation status can indicate whether the LLM communication 203 violates an LLM security policy 147. For example, the prompt injection prevention LLM 129*a* can evaluate whether the LLM communication includes a malicious prompt injection, the SDE leakage prevention LLM 129*b* can evaluate whether the LLM communication 203 includes SDEs, and so on. In an instance in which the security LLM 129 determines that the LLM communication 203 violates an LLM security policy 147, the initial security decision 206 can also include a modified message for a modified LLM communication 203, and a natural language explanation that describes how the original message of the LLM communication 203 violates the LLM security policy 147.

The ratification service 132 can use the LLM communication 203 and the initial security decision 206 as inputs to generate a final security decision 212 that confirms or refutes the initial security decision 206. A respective one of the support vector machine model 209*a*, the random forest model 209*b*, and the convolutional neural network model 209*c* can analyze the information and vote on whether to confirm or refute the initial security decision 206. If a majority of the votes confirm the initial security decision 206, then the ratification service 132 can provide a final security decision 212 that matches the initial security decision 206 on a particular LLM security policy 147. Otherwise, the ratification service 132 can provide a final security decision 212 that refutes or overturns the initial security decision 206. If the final security decision 212 overturns an initial security decision 206 that the LLM communication 203 has no security issue, then the ratification service 132 can use an internal LLM to generate a modified LLM communication 203 and a natural language explanation that describes how the original LLM communication 203 violates the LLM security policy 147.

If the final security decision 212 indicates that the LLM communication 203 lacks any security issue from any of the security LLMs 129, then the LLM security service 123 can transmit the original LLM communication 203 to a target destination. For example, an LLM prompt can be transmitted to the end-use LLM, and an LLM response can be transmitted to the application 144 and/or the client device 106. However, if the final security decision 212 identifies a security issue with the LLM communication 203, then the LLM security service 123 can transmit a modified LLM communication 203 to a target destination. The LLM security service 123 can also transmit the natural language explanation that describes how the original LLM communication 203 violates the LLM security policy 147.

If the security LLMs 129 indicate that multiple LLM security policies 147 are violated, the LLM security service 123 can prompt an "integration" LLM with a plurality of modified LLM communications 203 from multiple ones of the security LLMs 129. The integration LLM of the LLM security service 123 can output a single modified LLM communication 203 that integrates all of the modified LLM communications 203 from the security LLMs 129. The LLM security service 123 can also prompt the integration LLM with a plurality of natural language explanations that describes how the original LLM communication 203 violates the various LLM security policies 147. The integration LLM can output a single natural language explanation that integrates multiple natural language explanations that describes how the original LLM communication 203 violates multiple LLM security policies 147.

The ratification service 132 can also generate feedback training data 156. For example, if the final security decision 212 overturns an initial security decision 206, then the ratification service 132 can provide feedback training data 156 including the original LLM communication 203, the modified LLM communication 203, the initial security decision 206, the final security decision 212, an identity of the end-use LLM, a user identifier, and an application identifier.

Figure 3:
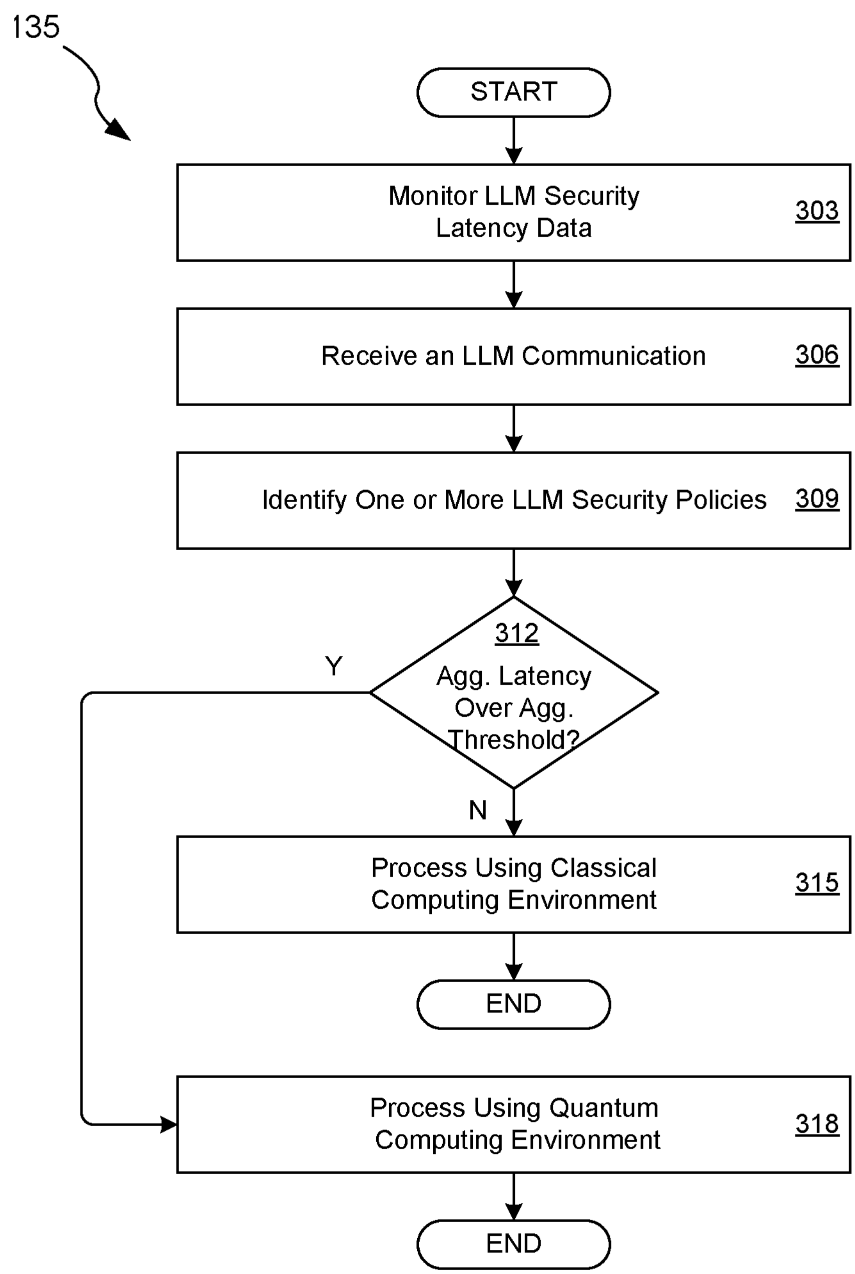
FIG. 3 is a flowchart illustrating functionality of a security performance profiler providing quantum computing enhancements for LLM security protections according to various embodiments of the present disclosure.

FIG. 3 is a flowchart providing an example of how the LLM security performance profiler 135 enables quantum computing enhanced LLM security protections. The flowchart of FIG. 3 can be viewed as depicting an example of elements of a method implemented by the LLM security performance profiler 135. Aspects of the described blocks can involve other components of the networked environment 100.

In block 303, the LLM security performance profiler 135 can monitor LLM security latency data 150. The LLM security latency data 150 can include a timestamped history of LLM communication processing latencies. The LLM security performance profiler 135 can monitor LLM security latency data 150 and identify aggregated latency metrics calculated by the LLM security performance profiler 135 or another component.

In block 306, the LLM security performance profiler 135 can receive an LLM communication 203 such as an LLM prompt or an LLM response. The LLM security performance profiler 135 can receive the LLM communications 203 by intercepting LLM communications 203 transmitted to, from, and within the digital computing environment 101, which can include a private network such as a private LAN or private WAN. Additionally or alternatively, the LLM security performance profiler 135 can intercept LLM communications 203 transmitted to and from an application 144.

The LLM security performance profiler 135 can also receive the LLM communication 203 from an application 144 or an end-use LLM. For example, some applications 144 can include instructions to transmit LLM prompts to the LLM security performance profiler 135 along with an address of a target end-use LLM. Once a security analysis is performed, the LLM security service 123 or the LLM security performance profiler 135 can forward the LLM prompt or a modified version of the LLM prompt to the end-use LLM. As a result, the end-use LLM can return the LLM response to the LLM security service 123 or the LLM security performance profiler 135. If the LLM security service 123 receives the LLM response, then it can transmit the LLM response to the LLM security performance profiler 135.

In block 309, the LLM security performance profiler 135 can identify at least one LLM security policy 147. The LLM security performance profiler 135 can identify the at least one LLM security policy 147 based at least in part on a user identifier, an LLM identifier of an end-use LLM, an application identifier of an application 144, a type of LLM communication 203, or any combination thereof. The LLM security performance profiler 135 can use the user identifier, the LLM identifier, the application identifier, the type of LLM communication 203, or any combination thereof as a key that maps to at least one value identifying at least one LLM security policy 147.

In block 312, the LLM security performance profiler 135 can determine whether an aggregate latency metric value is over a threshold latency value. This decision can be referred to as a computing environment type decision between the digital computing environment 101 and the quantum computing environment 102. If the aggregate latency metric value is lesser than (or equal to) the threshold latency value, the LLM security performance profiler 135 can move to block 315. Otherwise, if the aggregate latency metric value is greater than (or equal to) the threshold latency value the LLM security performance profiler 135 can move to block 318.

In block 315, the LLM security performance profiler 135 can process the LLM communication 203 using the LLM security service 123. For example, the LLM security performance profiler 135 can transmit a command to the LLM security service 123 that instructs the LLM security service 123 to process the LLM communication 203. The command to process the LLM communication 203 can include the LLM communication 203 and the LLM security policies 147.

In block 318, the LLM security performance profiler 135 can process the LLM communication 203 using the quantum LLM security service 126. For example, the LLM security performance profiler 135 can transmit a command to the quantum LLM security service 126 that instructs the quantum LLM security service 126 to process the LLM communication 203. The command to process the LLM communication 203 can include the LLM communication 203 and the LLM security policies 147.

Figure 4:
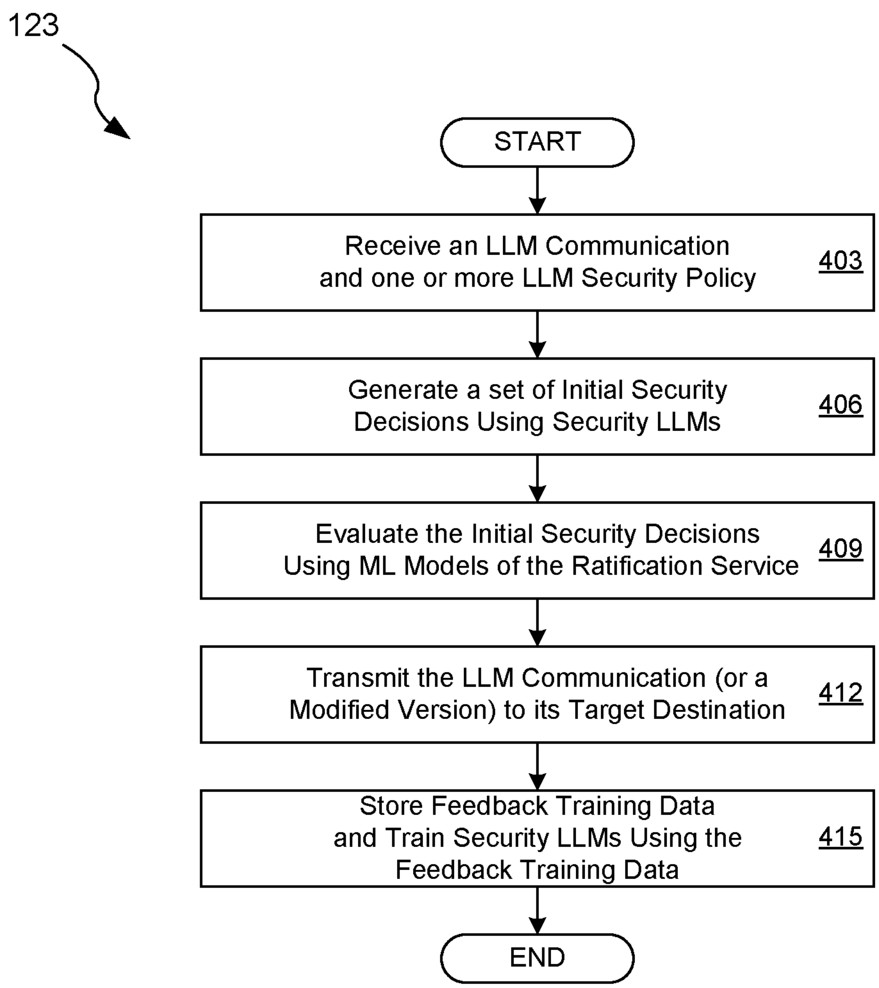
FIG. 4 is a flowchart illustrating functionality of an LLM security service providing quantum computing enhancements for LLM security protections according to various embodiments of the present disclosure.

FIG. 4 is a flowchart providing an example of how the LLM security service 123 enables quantum computing enhanced LLM security protections. The flowchart of FIG. 4 can be viewed as depicting an example of elements of a method implemented by the LLM security service 123. Aspects of the described blocks can involve other components of the networked environment 100.

In block 403, the LLM security service 123 can receive an LLM communication 203 and LLM security policies 147. The LLM security service 123 can receive a command to process the LLM communication 203 from the LLM security performance profiler 135. The command can include the LLM communication 203 and one or more LLM security policies 147. Alternatively, the command can include the LLM communication 203 and the LLM security service 123 can identify the LLM security policies 147 based at least in part on information identified from the LLM communication 203. The LLM security service 123 can identify LLM security policies 147 based at least in part on a user identifier, an LLM identifier of an end-use LLM, an application identifier of an application 144, and a type of LLM communication 203.

In block 406, the LLM security service 123 can generate a set of initial security decisions 206 for the LLM communication 203 using the security LLMs 129. The LLM security service 123 can identify a set of security LLMs 129 corresponding to the LLM security policies 147. The LLM security service 123 can provide the LLM communication 203 to a respective one of the security LLMs 129. The respective one of the security LLMs 129 can generate an initial security decision 206 in association with a corresponding LLM security policy 147. The initial security decision 206 can include an indication such as a flag or other data that indicates whether the LLM communication 203 violates an LLM security policy 147. If the LLM communication 203 violates an LLM security policy 147, the initial security decision 206 can also include a modified LLM communication 203 and a natural language explanation that describes how the original LLM communication 203 violates the LLM security policy 147.

In block 409, the LLM security service 123 can use process the initial security decisions 206 using the ratification service 132. The ratification service 132 can process a respective one of the initial security decisions 206. The ratification service 132 can generate a set of final security decisions 212 corresponding to the set of initial security decisions 206. The ratification service 132 can the LLM communication 203 and an initial security decision 206 as inputs to generate a final security decision 212 that confirms or refutes the initial security decision 206.

The ratification service 132 can include multiple machine learning models that can provide a set of votes on whether to confirm or refute a respective one of the initial security decision 206. If a majority of the votes confirm the initial security decision 206, then the ratification service 132 can provide a final security decision 212 that matches the initial security decision 206 on a particular LLM security policy 147. Otherwise, the ratification service 132 can provide a final security decision 212 that refutes or overturns the initial security decision 206 on the particular LLM security policy 147. If the final security decision 212 overturns an initial security decision 206 that the LLM communication 203 has no security issue, then the ratification service 132 can use an LLM to generate a modified LLM communication 203 and a natural language explanation that describes how the original LLM communication 203 violates the LLM security policy 147. In some examples, the ratification service 132 can prompt the security LLM 129 with prompting instructions indicating that the LLM communication 203 violates the corresponding LLM security policy 147, and to provide a natural language explanation that describes how the original LLM communication 203 violates the LLM security policy 147.

In block 412, the LLM security service 123 can transmit the LLM communication 203, or a modified version of the LLM communication 203, to a target destination indicated in the original LLM communication 203. If the final security decision 212 indicates that the LLM communication 203 lacks a violation of any of the security LLMs 129, then the LLM security service 123 can transmit the original LLM communication 203 to the target destination. For example, an LLM prompt can be transmitted to the targeted end-use LLM, and an LLM response can be transmitted to the targeted application 144 and/or client device 106.

However, if the final security decision 212 identifies a security issue with the LLM communication 203, then the LLM security service 123 can transmit a modified LLM communication 203 to the target destination. The LLM security service 123 can also transmit the natural language explanation that describes how the original LLM communication 203 violates the LLM security policy 147. If the set of initial security decisions 103 indicate that multiple LLM security policies 147 are violated, the LLM security service 123 can prompt an integration LLM to generate a single modified LLM communication 203 based at least in part on inputs including a set of modified LLM communications 203 from the security LLMs 129.

The LLM security service 123 can also prompt the integration LLM with a plurality of natural language explanations that describes how the original LLM communication 203 violates the various LLM security policies 147. The integration LLM can output a single natural language explanation that describes how the original LLM communication 203 violates multiple LLM security policies 147. The LLM security service 123 can transmit a message including the natural language explanation to the user interface 187, and an indicating that the LLM communication 203 has been corrected and forwarded. If the LLM communication 203 cannot be corrected, the LLM security service 123 can block the LLM communication 203. The LLM security service 123 can transmit a message indicating that the LLM communication 203 has been blocked.

In block 415, LLM security service 123 can store training data 156 and train the security LLMs 129 using the training data 156. For example, if the final security decision 212 overturns an initial security decision 206, then the LLM security service 123 and/or the ratification service 132 can generate feedback training data 156 including the original LLM communication 203, the modified LLM communication 203, the initial security decision 206, the final security decision 212, an identity of the end-use LLM, a user identifier, and an application identifier. This data can be stored in the digital computing environment 101. In an instance in which the ratification service 132 can generate feedback training data 156, the LLM security service 123 can receive this information from the ratification service 132. The LLM security service 123 can store this feedback training data 156 and periodically re-train the security LLMs 129 to provide more accurate results.

Figure 5:
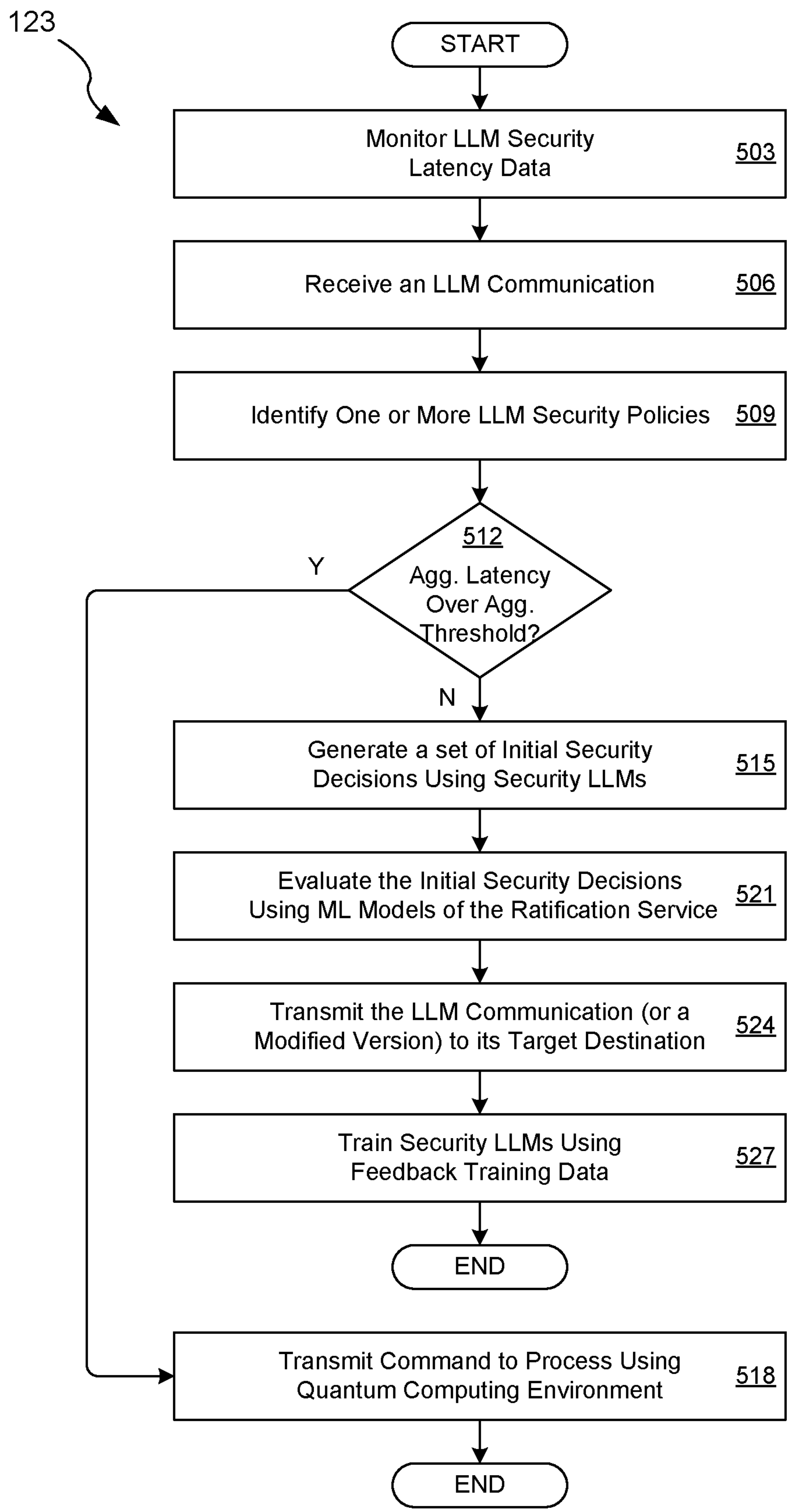
FIG. 5 is another flowchart illustrating functionality of an LLM security service providing quantum computing enhancements for LLM security protections according to various embodiments of the present disclosure.

FIG. 5 is a flowchart providing an example of how the LLM security service 123 enables quantum computing enhanced LLM security protections. In FIG. 5, which the LLM security service 123 provides scheduling decisions as between processing an LLM communications 203 using the LLM security service 123, and processing the LLM communications 203 using the quantum LLM security service 126. The flowchart of FIG. 5 can be viewed as depicting an example of elements of a method implemented by the LLM security service 123. Aspects of the described blocks can involve other components of the networked environment 100.

In block 503, LLM security service 123 can monitor LLM security latency data 150. The LLM security latency data 150 can include a timestamped history of LLM communication processing latencies. The LLM security service 123 can monitor LLM security latency data 150 and identify aggregated latency metrics calculated by the LLM security performance profiler 135 or another component.

In block 506, the LLM security service 123 can receive an LLM communication 203 such as an LLM prompt or an LLM response. The LLM security service 123 can receive the LLM communications 203 by intercepting LLM communications 203 transmitted to, from, and within the digital computing environment 101, which can include a private network such as a private LAN or private WAN. Additionally or alternatively, the LLM security service 123 can intercept LLM communications 203 transmitted to and from an application 144.

The LLM security service 123 can also receive the LLM communication 203 from an application 144 or an end-use LLM. For example, some applications 144 can include instructions to transmit LLM prompts to the LLM security service 123 along with an address of a target end-use LLM. Once a security analysis is performed, the LLM security service 123 itself, or the LLM security performance profiler 135, can forward the LLM prompt or a modified version of the LLM prompt to the end-use LLM. As a result, the end-use LLM can return the LLM response to the LLM security service 123.

In block 509, the LLM security service 123 can identify at least one LLM security policy 147. The LLM security service 123 can identify the at least one LLM security policy 147 based at least in part on a user identifier, an LLM identifier of an end-use LLM, an application identifier of an application 144, a type of LLM communication 203, or any combination thereof. The LLM security service 123 can use the user identifier, the LLM identifier, the application identifier, the type of LLM communication 203, or any combination thereof as a key that maps to at least one value identifying at least one LLM security policy 147.

In block 512, the LLM security service 123 can determine whether an aggregate latency metric value is over a threshold latency value. This decision can be referred to as a computing environment type decision between the digital computing environment 101 and the quantum computing environment 102. If the aggregate latency metric value is lesser than (or equal to) the threshold latency value, the LLM security performance profiler 135 can move to block 515. Otherwise, if the aggregate latency metric value is greater than (or equal to) the threshold latency value the LLM security performance profiler 135 can move to block 518.

In block 515, the LLM security service 123 can generate a set of initial security decisions 206 for the LLM communication 203 using the security LLMs 129. The LLM security service 123 can identify a set of security LLMs 129 corresponding to the LLM security policies 147. The LLM security service 123 can provide the LLM communication 203 to a respective one of the security LLMs 129. The respective one of the security LLMs 129 can generate an initial security decision 206 in association with a corresponding LLM security policy 147. The initial security decision 206 can include an indication such as a flag or other data that indicates whether the LLM communication 203 violates an LLM security policy 147. If the LLM communication 203 violates an LLM security policy 147, the initial security decision 206 can also include a modified LLM communication 203 and a natural language explanation that describes how the original LLM communication 203 violates the LLM security policy 147.

In block 521, the LLM security service 123 can use process the initial security decisions 206 using the ratification service 132. The ratification service 132 can process a respective one of the initial security decisions 206. The ratification service 132 can generate a set of final security decisions 212 corresponding to the set of initial security decisions 206. The ratification service 132 can the LLM communication 203 and an initial security decision 206 as inputs to generate a final security decision 212 that confirms or refutes the initial security decision 206.

The ratification service 132 can include multiple machine learning models that can provide a set of votes on whether to confirm or refute a respective one of the initial security decision 206. If a majority of the votes confirm the initial security decision 206, then the ratification service 132 can provide a final security decision 212 that matches the initial security decision 206 on a particular LLM security policy 147. Otherwise, the ratification service 132 can provide a final security decision 212 that refutes or overturns the initial security decision 206 on the particular LLM security policy 147. If the final security decision 212 overturns an initial security decision 206 that the LLM communication 203 has no security issue, then the ratification service 132 can use an LLM to generate a modified LLM communication 203 and a natural language explanation that describes how the original LLM communication 203 violates the LLM security policy 147. In some examples, the ratification service 132 can prompt the security LLM 129 with prompting instructions indicating that the LLM communication 203 violates the corresponding LLM security policy 147, and to provide a natural language explanation that describes how the original LLM communication 203 violates the LLM security policy 147.

In block 524, the LLM security service 123 can transmit the LLM communication 203, or a modified version of the LLM communication 203, to a target destination indicated in the original LLM communication 203. If the final security decision 212 indicates that the LLM communication 203 lacks a violation of any of the security LLMs 129, then the LLM security service 123 can transmit the original LLM communication 203 to the target destination. For example, an LLM prompt can be transmitted to the targeted end-use LLM, and an LLM response can be transmitted to the targeted application 144 and/or client device 106.

However, if the final security decision 212 identifies a security issue with the LLM communication 203, then the LLM security service 123 can transmit a modified LLM communication 203 to the target destination. The LLM security service 123 can also transmit the natural language explanation that describes how the original LLM communication 203 violates the LLM security policy 147. If the set of initial security decisions 103 indicate that multiple LLM security policies 147 are violated, the LLM security service 123 can prompt an integration LLM to generate a single modified LLM communication 203 based at least in part on inputs including a set of modified LLM communications 203 from the security LLMs 129.

The LLM security service 123 can also prompt the integration LLM with a plurality of natural language explanations that describes how the original LLM communication 203 violates the various LLM security policies 147. The integration LLM can output a single natural language explanation that describes how the original LLM communication 203 violates multiple LLM security policies 147. The LLM security service 123 can transmit a message including the natural language explanation to the user interface 187, and an indicating that the LLM communication 203 has been corrected and forwarded. If the LLM communication 203 cannot be corrected, the LLM security service 123 can block the LLM communication 203. The LLM security service 123 can transmit a message indicating that the LLM communication 203 has been blocked.

In block 527, LLM security service 123 can train the security LLMs 129 using the training data 156. For example, if the final security decision 212 overturns an initial security decision 206, then the LLM security service 123 and/or the ratification service 132 can generate feedback training data 156 including the original LLM communication 203, the modified LLM communication 203, the initial security decision 206, the final security decision 212, an identity of the end-use LLM, a user identifier, and an application identifier. In an instance in which the ratification service 132 can generate feedback training data 156, the LLM security service 123 can receive this information from the ratification service 132. The LLM security service 123 can store this feedback training data 156 and periodically re-train the security LLMs 129 to provide more accurate results.

In block 518, the LLM security performance profiler 135 can process the LLM communication 203 using the quantum LLM security service 126. For example, the LLM security performance profiler 135 can transmit a command to the quantum LLM security service 126 that instructs the quantum LLM security service 126 to process the LLM communication 203. The command to process the LLM communication 203 can include the LLM communication 203 and the LLM security policies 147.

Figure 6:
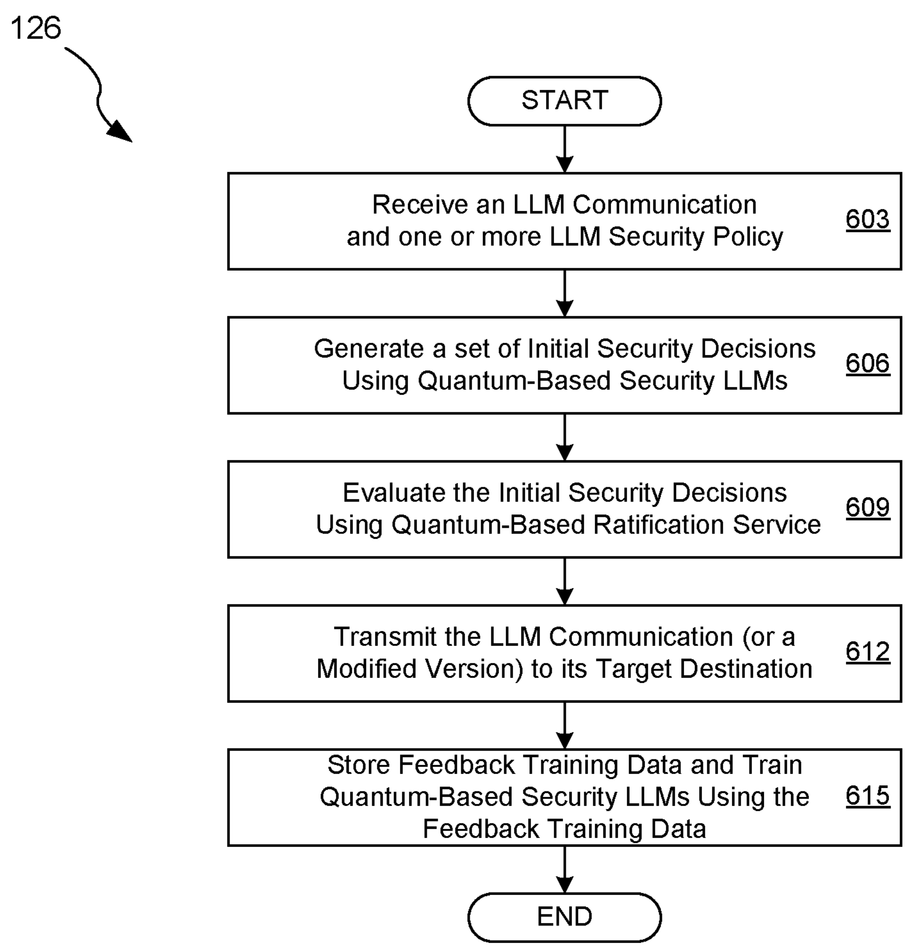
FIG. 6 is a flowchart illustrating functionality a quantum-based LLM security service providing quantum computing enhancements for LLM security protections according to various embodiments of the present disclosure.

FIG. 6 is a flowchart providing an example of how the quantum LLM security service 126 enables quantum computing enhanced large language model (LLM) security protections. The flowchart of FIG. 6 can be viewed as depicting an example of elements of a method implemented by the quantum LLM security service 126. Aspects of the described blocks can involve other components of the networked environment 100.

In block 603, the quantum LLM security service 126 can receive an LLM communication 203 and LLM security policies 147. The quantum LLM security service 126 can receive a command to process the LLM communication 203 from the LLM security performance profiler 135. The command can include the LLM communication 203 and one or more LLM security policies 147. Alternatively, the command can include the LLM communication 203 and the quantum LLM security service 126 can identify the LLM security policies 147 based at least in part on information identified from the LLM communication 203. The quantum LLM security service 126 can identify LLM security policies 147 based at least in part on a user identifier, an LLM identifier of an end-use LLM, an application identifier of an application 144, and a type of LLM communication 203.

In block 606, the quantum LLM security service 126 can generate a set of initial security decisions 206 for the LLM communication 203 using the quantum-based security LLMs 159. The quantum LLM security service 126 can identify a set of quantum-based security LLMs 159 corresponding to the LLM security policies 147. The quantum LLM security service 126 can provide the LLM communication 203 to a respective one of the quantum-based security LLMs 159. The respective one of the quantum-based security LLMs 159 can generate an initial security decision 206 in association with a corresponding LLM security policy 147. The initial security decision 206 can include an indication such as a flag or other data that indicates whether the LLM communication 203 violates an LLM security policy 147. If the LLM communication 203 violates an LLM security policy 147, the initial security decision 206 can also include a modified LLM communication 203 and a natural language explanation that describes how the original LLM communication 203 violates the LLM security policy 147.

In block 609, the quantum LLM security service 126 can process the initial security decisions 206 using the quantum-based ratification service 162. The quantum-based ratification service 162 can process a respective one of the initial security decisions 206. The quantum-based ratification service 162 can generate a set of final security decisions 212 corresponding to the set of initial security decisions 206. The quantum-based ratification service 162 can the LLM communication 203 and an initial security decision 206 as inputs to generate a final security decision 212 that confirms or refutes the initial security decision 206.

The quantum-based ratification service 162 can include multiple quantum-based machine learning models that can provide a set of votes on whether to confirm or refute a respective one of the initial security decision 206. If a majority of the votes confirm the initial security decision 206, then the quantum-based ratification service 162 can provide a final security decision 212 that matches the initial security decision 206 on a particular LLM security policy 147. Otherwise, the quantum-based ratification service 162 can provide a final security decision 212 that refutes or overturns the initial security decision 206 on the particular LLM security policy 147. If the final security decision 212 overturns an initial security decision 206 that the LLM communication 203 has no security issue, then the quantum-based ratification service 162 can use an LLM to generate a modified LLM communication 203 and a natural language explanation that describes how the original LLM communication 203 violates the LLM security policy 147. In some examples, the quantum-based ratification service 162 can prompt the security LLM 129 with prompting instructions indicating that the LLM communication 203 violates the corresponding LLM security policy 147, and to provide a natural language explanation that describes how the original LLM communication 203 violates the LLM security policy 147.

In block 612, the quantum LLM security service 126 can transmit the LLM communication 203, or a modified version of the LLM communication 203, to a target destination indicated in the original LLM communication 203. If the final security decision 212 indicates that the LLM communication 203 lacks a violation of any of the quantum-based security LLMs 159, then the quantum LLM security service 126 can transmit the original LLM communication 203 to the target destination. For example, an LLM prompt can be transmitted to the targeted end-use LLM, and an LLM response can be transmitted to the targeted application 144 and/or client device 106.

However, if the final security decision 212 identifies a security issue with the LLM communication 203, then the quantum LLM security service 126 can transmit a modified LLM communication 203 to the target destination. The quantum LLM security service 126 can also transmit the natural language explanation that describes how the original LLM communication 203 violates the LLM security policy 147. If the set of initial security decisions 103 indicate that multiple LLM security policies 147 are violated, the quantum LLM security service 126 can prompt an integration LLM to generate a single modified LLM communication 203 based at least in part on inputs including a set of modified LLM communications 203 from the quantum-based security LLMs 159.

The quantum LLM security service 126 can also prompt the integration LLM with a plurality of natural language explanations that describes how the original LLM communication 203 violates the various LLM security policies 147. The integration LLM can output a single natural language explanation that describes how the original LLM communication 203 violates multiple LLM security policies 147. The quantum LLM security service 126 can transmit a message including the natural language explanation to the user interface 187, and an indicating that the LLM communication 203 has been corrected and forwarded. If the LLM communication 203 cannot be corrected, the quantum LLM security service 126 can block the LLM communication 203. The quantum LLM security service 126 can transmit a message indicating that the LLM communication 203 has been blocked.

In block 615, quantum LLM security service 126 can store training data 156 and train the quantum-based security LLMs 159 using the training data 156. For example, if the final security decision 212 overturns an initial security decision 206, then the quantum LLM security service 126 and/or the quantum-based ratification service 162 can generate feedback training data 156 including the original LLM communication 203, the modified LLM communication 203, the initial security decision 206, the final security decision 212, an identity of the end-use LLM, a user identifier, and an application identifier. This data can be stored in the quantum computing environment 102. In an instance in which the quantum-based ratification service 162 generates feedback training data 156, the quantum LLM security service 126 can receive this information from the ratification service 132. The quantum LLM security service 126 can store this feedback training data 156 and periodically re-train the quantum-based security LLMs 159 to provide more accurate results.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages could be added to the logical flow described herein, for purposes of enhanced utility, accounting, performance measurement, or providing troubleshooting aids, etc. It is understood that all such variations are within the scope of the present disclosure.

The sequence diagrams and flowcharts provide a general description of the operation of the various components. Although the general descriptions can provide provides an example of the interactions between the various components, other interactions between the various components are also possible according to various embodiments of the present disclosure. Interactions described with respect to a particular figure or sequence diagram can also be performed in relation to the other figures and sequence diagrams herein.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:

at least one computing device comprising at least one processor and at least one memory; and machine-readable instructions stored in the at least one memory that, when executed by the at least one processor, cause the at least one computing device to at least:

receive a large language model (LLM) communication corresponding to an LLM prompt for an LLM, or an LLM response from the LLM;

identify an LLM communication processing latency value that provides an indication of a security processing time for processing LLM communications using a digital computing environment that performs bit-based operations;

determine whether to perform an LLM security analysis on the LLM communication using the digital computing environment or a quantum computing environment that perform qubit-based operations, based at least in part on the LLM communication processing latency value and a threshold latency value; and transmit a command to perform the LLM security analysis based on the determination.

2. The system of claim 1, wherein the LLM security analysis comprises generating an initial security decision using a security LLM, and evaluating the initial security decision using a plurality of machine learning models, and generating a final security decision.

3. The system of claim 1, wherein the machine-readable instructions, when executed by the at least one processor, further cause the at least one computing device to at least:

monitor a plurality of LLM communication processing latencies for a plurality of LLM communications processed using the digital computing environment.

4. The system of claim 3, wherein the LLM communication processing latency value comprises an aggregated latency metric calculated based at least in part on the plurality of LLM communication processing latencies.

5. The system of claim 1, wherein the machine-readable instructions, when executed by the at least one processor, further cause the at least one computing device to at least:

identify at least one LLM security policy for the LLM communication, wherein the at least one LLM security policy indicates at least one security LLM to utilize for the security analysis.

6. The system of claim 1, wherein the command to perform the LLM security analysis causes the quantum computing environment to perform the LLM security analysis based at least on a determination that the processing latency value is greater than or equal to a threshold latency value.

7. The system of claim 1, wherein the command to perform the LLM security analysis causes the digital computing environment to perform the LLM security analysis based at least on a determination that the processing latency value is below a threshold latency value.

8. A method, comprising:

receiving, by a large language model (LLM) security service, an LLM communication corresponding to an LLM prompt for an LLM, or an LLM response from the LLM;

generating, using a security LLM of the LLM security service, an initial security decision comprising a LLM security policy violation status for the LLM communication;

evaluating, based at least in part on the LLM communication, the initial security decision using a plurality of machine learning models of the LLM security service, wherein the LLM security service generates a final security decision based at least in part on a plurality of violation status votes from the plurality of machine learning models; and transmitting, by the LLM security service, the LLM communication or a modified version of the LLM communication to a network endpoint specified by the LLM communication.

9. The method of claim 8, further comprising:

storing, by the LLM security service, feedback training data comprising the initial security decision and the final security decision; and training the security LLM using the feedback training data.

10. The method of claim 8, wherein the LLM security service is executed using a bit-based computing architecture that performs bit-based operations.

11. The method of claim 8, wherein the LLM security service is executed using a quantum computing architecture that performs qubit-based operations.

12. The method of claim 8, wherein the LLM security service comprises a plurality of security LLMs corresponding to a plurality of LLM-specific security issues.

13. The method of claim 12, wherein the LLM security service processes the LLM communication using a subset of the plurality of security LLMs specified by at least one LLM security policy identified in association with the LLM communication.

14. The method of claim 8, wherein the LLM communication comprises a message, and the initial security decision comprises a modified LLM communication comprising a modified message.

15. A system, comprising:

at least one computing device comprising at least one processor and at least one memory; and machine-readable instructions stored in the at least one memory that, when executed by the at least one processor, cause the at least one computing device to at least:

receive a large language model (LLM) communication corresponding to an LLM prompt for an LLM, or an LLM response from the LLM;

generate an initial security decision using a security LLM, the initial security decision comprising a LLM security policy violation status for the LLM communication;

evaluate, based at least in part on the LLM communication, the initial security decision using a plurality of machine learning models, wherein a final security decision is generated based at least in part on a plurality of violation status votes from the plurality of machine learning models; and transmit the LLM communication or a modified version of the LLM communication to a network endpoint specified by the LLM communication.

16. The system of claim 15, wherein the machine-readable instructions, when executed by the at least one processor, further cause the at least one computing device to at least:

store feedback training data comprising the initial security decision and the final security decision.

17. The system of claim 16, wherein the machine-readable instructions, when executed by the at least one processor, further cause the at least one computing device to at least:

train the security LLM using the feedback training data.

18. The system of claim 15, wherein the LLM communication comprises a message, and the initial security decision comprises a modified LLM communication comprising a modified message.

19. The system of claim 15, wherein the machine-readable instructions, when executed by the at least one processor, further cause the at least one computing device to at least:

identify an LLM security policy for the LLM communication, wherein LLM security policy specifies the security LLM or an LLM security issue that the security LLM analyzes.

20. The system of claim 19, wherein the LLM communication is processed using a subset of a plurality of security LLMs specified by at least one LLM security policy identified in association with the LLM communication.

* * * * *